United States Patent [19]
Paulson et al.

[11] 3,840,312
[45] Oct. 8, 1974

[54] DYNAMIC PRESSURE CONTROL SYSTEM

[75] Inventors: Donald C. Paulson; Rodney J. Groleau, both of Southington, Conn.

[73] Assignee: Control Process, Incorporated, Plantsville, Conn.

[22] Filed: Apr. 11, 1973

[21] Appl. No.: 350,148

[52] U.S. Cl............ 425/149, 235/151.1, 235/151.3, 264/329, 425/139, 425/145
[51] Int. Cl. .......................... B29f 1/06, G06g 7/66
[58] Field of Search............. 235/151, 151.1, 151.3; 425/140-149; 264/40, 329; 73/141 A, 88.5

[56] References Cited
UNITED STATES PATENTS

| | | | |
|---|---|---|---|
| 3,255,716 | 6/1966 | Knoechel et al...................... | 264/40 |
| 3,436,443 | 4/1969 | Hutchinson......................... | 425/145 |
| 3,628,901 | 12/1971 | Paulson.............................. | 425/149 |
| 3,642,402 | 2/1972 | Hutchinson et al................. | 425/144 |
| 3,695,800 | 10/1972 | Hutchinson et al................. | 425/146 |
| 3,712,772 | 1/1973 | Hunkar............................... | 425/141 |
| 3,713,333 | 1/1973 | MacGeorge ....................... | 73/141 A |
| 3,734,663 | 5/1973 | Holm ................................. | 425/149 |
| 3,741,700 | 6/1973 | Hutchinson et al................. | 425/149 |
| 3,767,339 | 10/1973 | Hunkar.............................. | 425/145 |

OTHER PUBLICATIONS
Hunkar Laboratories Inc., Injection Molders (Advertisement), Plastics Technology, Vol. 19, No. 2, Feb. 1973, p. 76.

Primary Examiner—Felix D. Gruber

[57] ABSTRACT

A dynamic pressure control system is provided for controlling cavity pressure in plastic injection molding machines, thermoset transfer molding machines, thermoset injection molding machines, die cast machines, etc. The dynamic pressure control system includes sensing means for sensing pressure of the material fed to a mold cavity, and signal generating means for generating a signal corresponding to the pressure sensed by the sensing means. In addition, the control system is provided with means for comparing the signal generated by the signal generating means to a pair of predetermined pressure set points. Further, the control system includes a first means operable to cause material to flow to the mold cavity at a first rate, and a second means operable to cause material to flow to the mold cavity at a second rate. The control system also includes control means responsive to the signal generated by the signal generating means reaching the level of one of the pair of predetermined pressure set points to render the aforedescribed first means inoperative and responsive to the signal generated by the signal generating means reaching the level of the other of the pair of predetermined presssure set points to render the aforedescribed second means inoperative.

13 Claims, 10 Drawing Figures

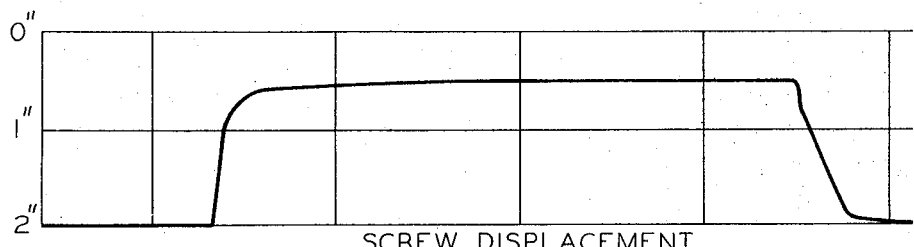
FIG.4  SCREW DISPLACEMENT
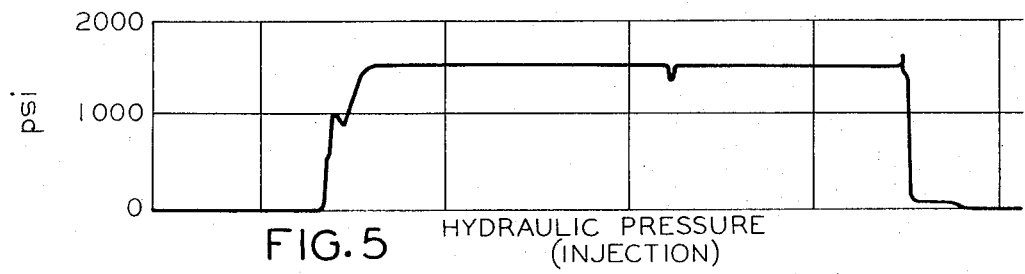
FIG.5  HYDRAULIC PRESSURE (INJECTION)
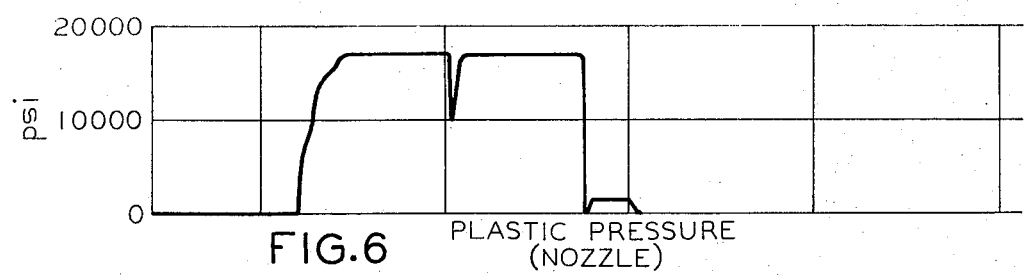
FIG.6  PLASTIC PRESSURE (NOZZLE)
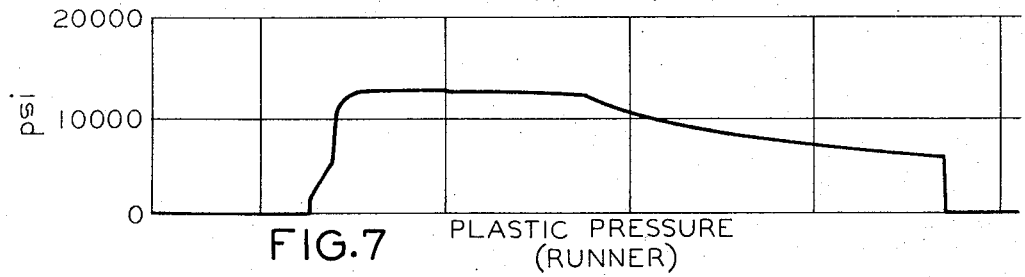
FIG.7  PLASTIC PRESSURE (RUNNER)
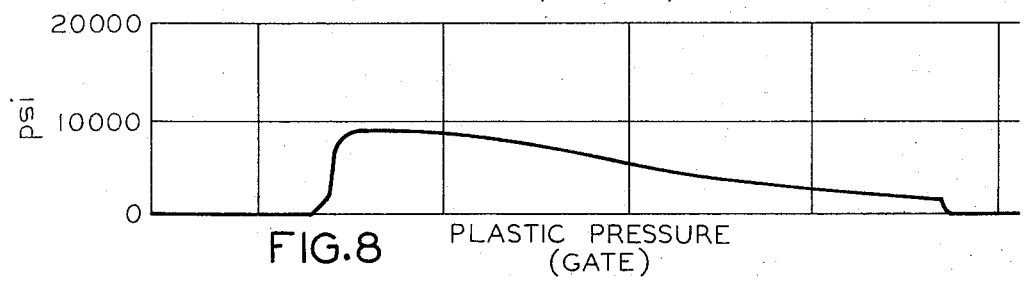
FIG.8  PLASTIC PRESSURE (GATE)
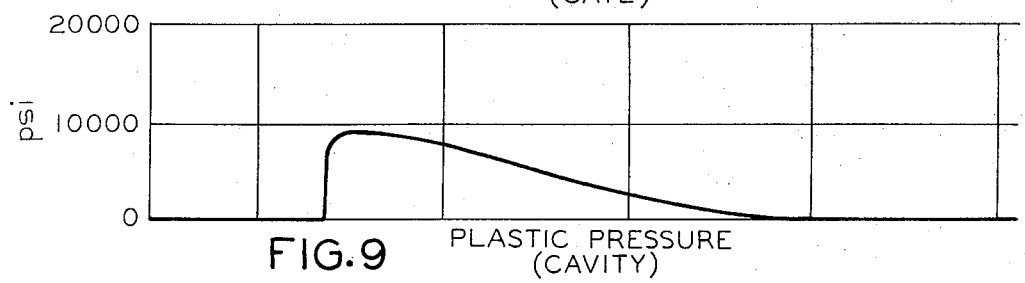
FIG.9  PLASTIC PRESSURE (CAVITY)

DYNAMIC PRESSURE CONTROL SYSTEM

BACKGROUND OF THE INVENTION

It has long been known that variations in the pressure of the material being molded in the cavity of a molding machine or cast in the cavity of a die cast machine is the most frequent cause of flash being formed on the parts being produced, short shots of material being fed to the cavity, and inconsistencies in the properties of the parts produced. With particular reference to the operation of molding machines, pressure variations occur because of changes in the viscosity of the material, i.e., plastic being molded. Such changes are commonly found to be due to either temperature variations or molecular weight. Pressure variations also occur as a result of variations in machine performance due to such things as timer errors, oil temperature, hydraulic response, etc. In addition, pressure variations are attributable to operator errors wherein wrong timers, settings, etc., are employed by the operator.

Most rejects, it has been found, are caused during the "filling" portion, i.e., when material is being fed to the cavity, and during the "packing" portion, i.e., when the material is solidifying in the cavity, of the molding cycle. It is this part of the cycle, i.e., the "filling" and "packing" portions thereof when orientation is developed, molecular packing is induced, and peak pressures are determined. Any errors or inconsistencies in the dynamics of filling and packing result in variations in the parts produced.

As the cavity fills with material, the pressure therein will rise slowly until packing of the material begins to occur, whereupon the pressure will rise rapidly. This may be referred to as the "dynamic" portion of the cycle of operation of the machine. If the pressure in the cavity rises too slowly or is stopped too soon, then short shots will occur because the material is afforded an opportunity to solidify before the cavity is entirely full, or in the case of the mold having plural cavities, before all of the cavities are full of material. If the pressure rises too rapidly or occurs too long, then flash is likely to form on the part being produced, due to "overpacking."

The likelihood that pressure variations will occur causing the undesirable results described above is particularly likely wherein thin-walled parts, i.e., lids, containers, housings, etc. are being produced inasmuch as the production of the latter requires that the cavity be filled quickly but not be overpacked. These two requirements, however, are often in conflict. As a result, short shots caused by insufficient dynamic pressure, flashed parts caused by excessive dynamic pressure, and warped parts caused by overpacking or underpacking are common.

In order to eliminate the existence of undesirable pressure variations in the mold cavity, a number of different types of control systems have been proposed for inclusion in molding machines as a means of effectuating control over the latter thereby to enable the amount of pressure in the cavity of the machine to be regulated. Because of the difficulty in controlling dynamic pressure, one approach which has been employed in the prior art for example, is the so-called volume-feeding technique wherein a limit switch or other equivalent control device is utilized to control the amount of material fed each cycle, and the screw by means of which the material is commonly fed into the mold is caused to move through a predetermined distance. This method works as long as the limit switch is accurate and the non-return valve operatively associated with the screw does not leak. However, these two conditions rarely exist for long.

Another approach similar to the aforedescribed volume-feeding technique, which has also been utilized heretofore, is the technique of weight-feeding wherein the theoretical weight of the material needed to fill the mold completely is determined and this amount of material is caused to be fed to the mold once each cycle. Although weight feeding has been found to produce more accurate results than the volume-feeding technique, it also nevertheless suffers from a disadvantage, mainly, that even a small deviation in the weight of the material fed to the mold can produce wide variations in cavity pressure.

Still another technique, which previously has sometimes been employed, involves sensing the forward velocity of the screw which is operative to cause material to be fed to the mold. The difficulty with this approack however, is that a change in the forward velocity of the screw may not necessarily arise from the fact that the mold cavity has become filled with material. Rather, this change may be attributable to the existence of other factors affecting the flow of the material intermediate the point at which the material leaves engagement with the screw and the point at which the material enters the mold cavity. More particularly, since cavity pressure is not being determined from readings taken directly within the cavity, but instead is based on readings obtained at a point remote therefrom, other factors such as a blockage in the path of flow of the material, etc., may actually be the cause for a change occuring in the forward velocity of the screw rather than the fact that the cavity has filled with material. Thus, utilizing this technique, there exists opportunities for inaccurately portraying the condition of the cavity pressure.

Other techniques have also been employed heretodate in the prior art, however, each of these other techniques also suffers from one or more similar disadvantages.

Accordingly, it is an object of the present invention to provide a novel and improved dynamic pressure control system, which is operable to control cavity pressure in molding machines and cavity machines, by controlling the shot size of material fed to the machine cavity based on sensings of cavity pressure obtained directly from the cavity.

It is also an object of the present invention to provide such a dynamic pressure control system, which is operable to control cavity pressure by sensing deviations in the required level of cavity pressure during a given cycle of operation, and by providing corresponding directions thereby to restore the cavity pressure to the necessary level during the same cycle that the deviations are sensed.

It is another object of the present invention to provide such a dynamic pressure control system which is operable to consistently provide the exact cavity pressure needed during each successive cycle of operation of the machine.

A further object of the present invention is to provide such a dynamic pressure control system which is not dependent for purposes of providing control of the cavity pressure on mechanical control of the shot size of the material and as such does not suffer from the vagaries of operation of the mechanical components utilized in providing such mechanical control.

A still further object of the present invention is to provide such a dynamic pressure control system for controlling cavity pressure wherein electronic sensing is employed thereby providing fast response time enabling pressure rises to be limited rapidly.

Yet another object of the present invention is to provide such a dynamic pressure control system for controlling cavity pressure which is readily capable of use with conventional type molding machines and casting machines, which is characterized by its relatively long operating life, and which is relatively easy to assemble and employ.

SUMMARY OF THE INVENTION

It has now been found that the foregoing and related objects can be readily attained in a dynamic pressure control system wherein control over the cavity pressure is achieved by controlling the shot size of the material fed to the mold cavity. The dynamic pressure control system includes sensing means for sensing pressure of the material fed to a mold cavity, and signal generating means for generating a signal corresponding to the pressure sensed by the sensing means. The control system, in addition, is provided with means for comparing the signal generated by the signal generating means to a pair of predetermined pressure set points. Further, the control system includes a first means operable to cause material to flow to the mold cavity at a first rate, and a second means operable to cause material to flow to the mold cavity at a second rate. Also, the control system includes control means responsive to the signal generated by the signal generating means reaching a level of one of the pair of predetermined pressure set points to render the aforedescribed first means inoperative and responsive to the signal generated by signal generating means reaching the level of the other of the pair of predetermined pressure set points to render the aforedescribed second means inoperable.

In accordance with the preferred embodiment of the invention, the sensing means comprises a strain gauge transducer which is inserted into the cavity of the mold and is operable to provide an electrical signal output corresponding to the pressure sensed thereby in the mold cavity. This signal is amplified to a usable level, calibrated to provide readings in pounds per square inch, and compared to a pair of pre-established pressure set points. One of the latter set points comprises a high pressure mold cavity setting while the other comprises the dynamic pressure control set point, i.e., the mold cavity pressure required to fill and pack the mold regardless of viscosity changes, timer inconsistencies, or power fluctuations. The molding machine is provided with an injection forward solenoid which when energized allows oil to flow to the injection cylinder, and a booster solenoid which when energized allows the high pressure pump to supply oil to the injection cylinder. The dynamic pressure control system is provided with control means which operates to de-energize the booster solenoid whenever the mold pressure in the cavity is sensed to have become higher than the dynamic pressure control set point thereby switching the high pressure pump out of the circuit and allowing the holding pump to supply oil to the injection cylinder, and which operates to de-energize the injection forward solenoid whenever the mold cavity pressure is sensed to have become higher than the high pressure set point thereby stopping the flow of all hydraulic oil to the injection cylinder.

BRIEF DESCRIPTION OF THE DRAWINGS

FIG. 4 is a graph illustrating the change in mold pressure over time during a cycle of operation of an injection mold machine wherein the ordinate of the graph is in terms of inches of screw displacement and the abscissa is in terms of units of time;

FIG. 5 is a graph illustrating the change in mold pressure over time during a cycle of operation of an injection molding machine wherein the ordinate of the graph is in terms of the hydraulic pressure in the injection cylinder measured in pounds per square inch (psi) and the abscissa is in terms of units per time;

FIG. 6 is a graph illustrating the change in mold pressure over time during a cycle of operation of an injection molding machine wherein the ordinate of the graph is in terms of the pressure of the material at the mozzle measured in pounds per square inch (psi) and the abscissa is in terms of units of time;

FIG. 7 is a graph illustrating the change in mold pressure over time during a cycle of operation of an injection molding machine wherein the ordinate of the graph is in terms of the pressure of the material in the runner measured in pounds per square inch (psi) and the abscissa is in terms of units of time;

FIG. 8 is a graph illustrating the change in mold pressure over time during a cycle of operation of an injection molding machine wherein the ordinate of the graph is in terms of the pressure of the material at tha gate measured in pounds per square inch (psi) and the abscissa is in terms of units of time;

FIG. 9 is a graph illustrating the change in mold pressure over time during a cycle of operation of an injection molding machine wherein the ordinate is in terms of the pressure of the material in the cavity measured in pounds per square inch (psi) and the abscissa is in terms of units of time.

DETAILED DESCRIPTION OF THE ILLUSTRATED EMBODIMENT

Figures 1, 2:
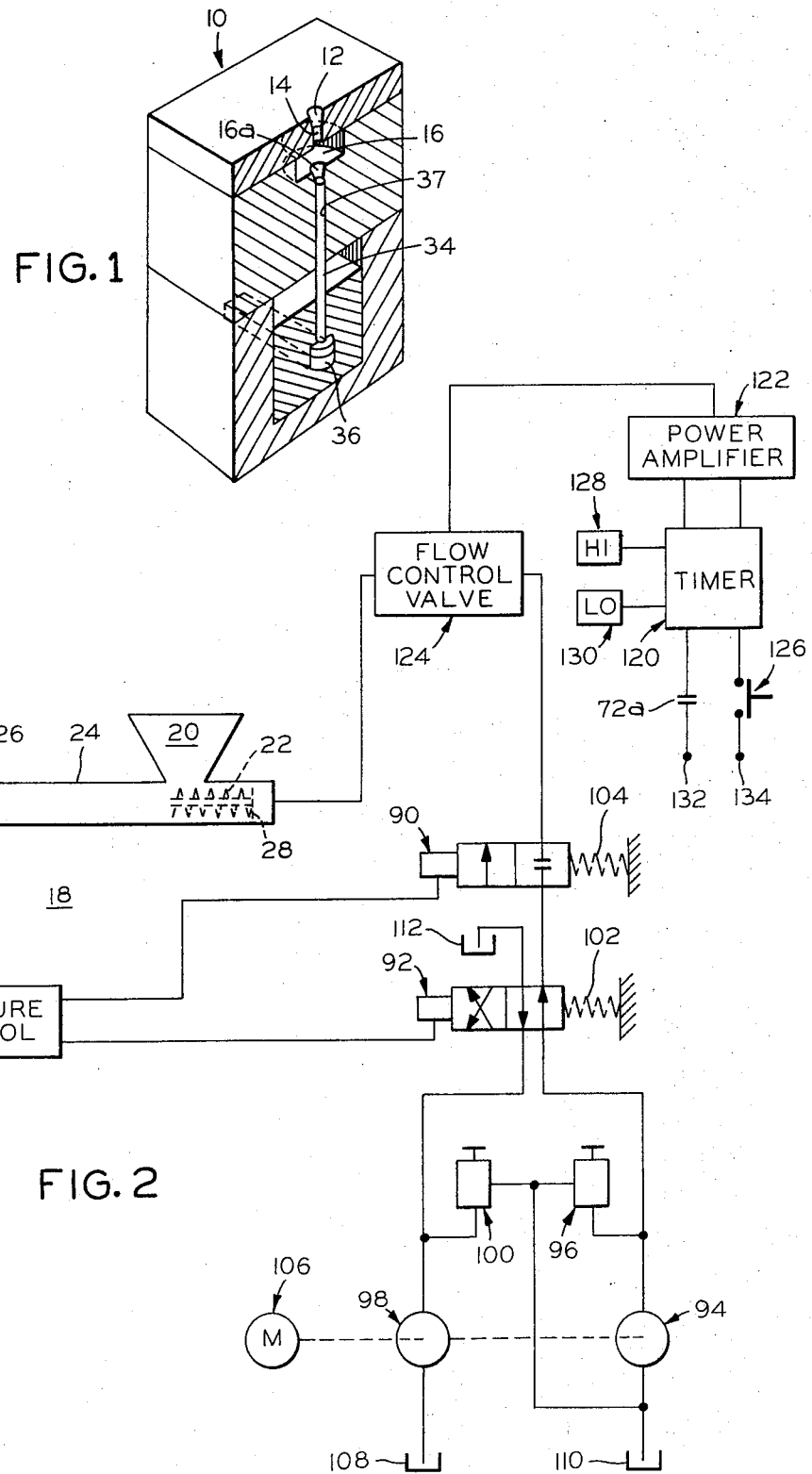
FIG. 1 is a perspective view of the sensing means of a dynamic pressure control system in accordance with the present invention, illustrated embodied in an injection machine mold, the latter being shown in cross-section for purposes of clarity of illustration.
FIG. 2 is a block diagram of the major components of an injection molding machine which is equipped with a dynamic pressure control system in accordance with the present invention.

Referring now to FIG. 1 of the drawings, there is illustrated therein a mold, generally designated by reference numeral 10, of the type which is commonly to be found employed in injection molding machines. For purposes of describing the invention, one particular form of mold 10 has been selected for illustration.

However, it is to be understood that the invention is not limited in its applicability to this particular form of mold but rather that the invention may equally well be utilized with other forms of molds, if so desired. Such other forms of molds include, for example, hot runner molds, partial hot runner molds, insulated runner molds, and molds which require a multinozzle injection molding machine. In addition, the invention is applicable to die casting machines wherein it is desired to eliminate pressure variations in the material being cast in the cavity of the die casting machine. The mold 10 which is depicted in FIG. 1 as being of multi-sectional construction has a passage formed therein comprising the sprue 12, and the gate 14. One end of the sprue 12 extends to the external surface of mold 10 as viewed with reference to FIG. 1 while the other end of sprue 12 connects with the gate 14. The gate 14 extends between the sprue 12 and the single mold cavity 16. Although the mold 10 has been illustrated as embodying only a single cavity 16, it is to be understood that the mold 10, without departing from the essence of the invention, could equally well be provided with multicavities.

Turning to FIG. 2 of the drawings, the major components of an injection molding machine, generally designated by reference numeral 18, are illustrated in block diagram form therein. Referring to FIG. 2, material of the type suitably adapted for molding purposes is supplied from a suitable source (not shown) to the feed hopper 20. In accord with conventional practice, the molding material supplied to the hopper 20 is fed therefrom into the space which exists between the screw 22 and the inner wall of the cylindrical housing 24 in which the screw 22 is suitably mounted for rotational movement. As the screw 22 rotates the material which has been fed into the interior of the housing 24 is kneaded and plasticized by the action of the screw 22. Further, the rotational movement of the screw 22 causes the material to be advanced to the area ahead of the screw 22 and into the nozzle 26. The material is injected from the nozzle 26 into the cavity 16 of the mold 10. More specifically, the path of flow of the material is from the nozzle 26 through the sprue 12 and gate 14 to the cavity 16.

The screw 20 is connected at its right-hand end as viewed with reference to FIG. 2 of the drawings, to a hydraulically operated injection cylinder 28. In a manner yet to be described, fluid such as hydraulic oil is pumped to the right-hand end portion of the housing 24 as viewed with reference to FIG. 2 wherein the hydraulic oil functions to cause the movement of the cylinder 28 and thereby the screw 22. Further, as is readily apparent, the extent of displacement of the screw 22 is one of the variables which determines the shot size, i.e., the amount of material which is injected into the mold 10 from the nozzle 24 and thus ultimately the amount of material which reaches the cavity 16.

Figure 3:
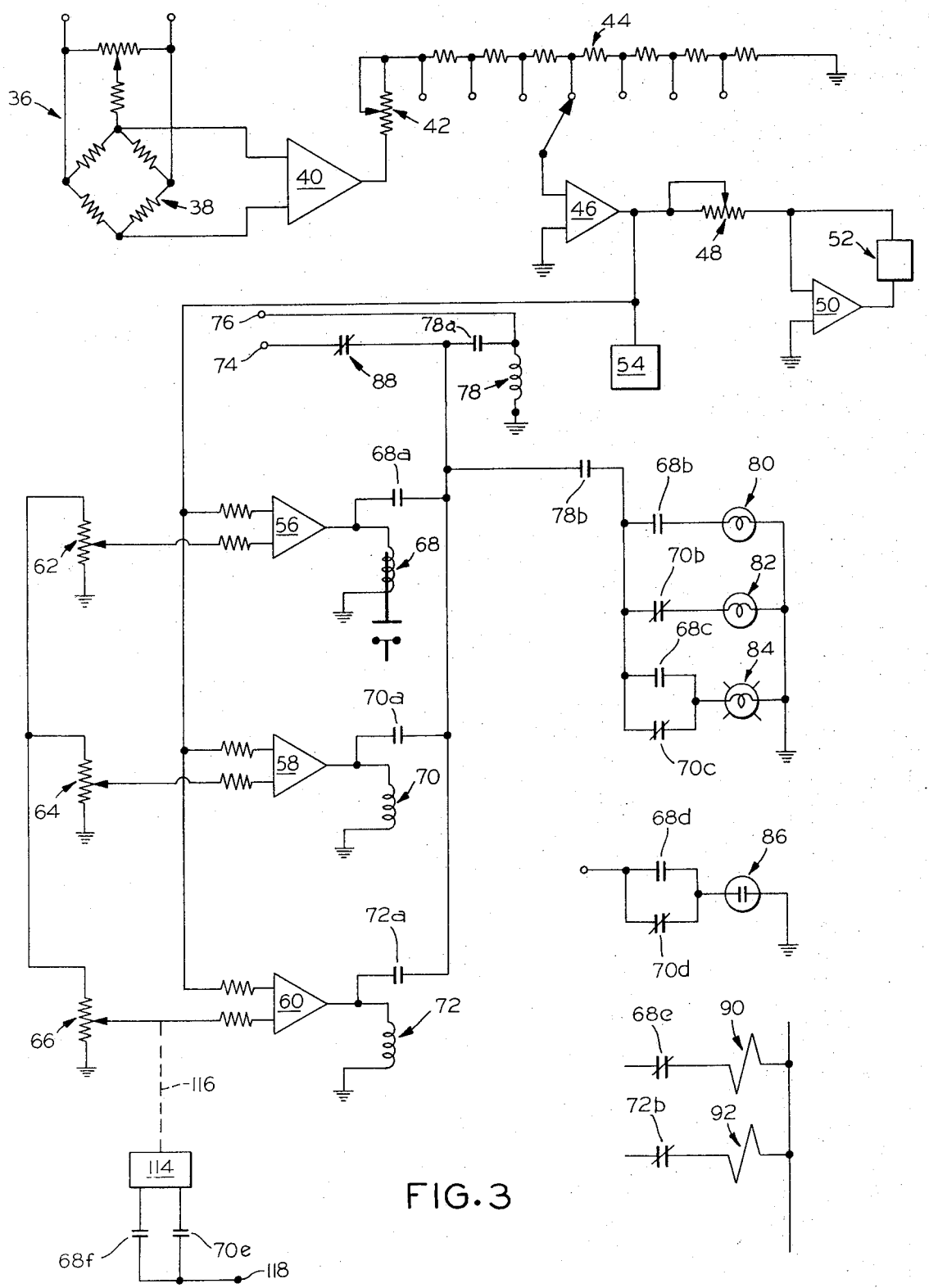
FIG. 3 is a schematic electrical diagram of the circuitry of a dynamic pressure control system in accordance with the present invention.

In order to eliminate variations in mold cavity pressure that cause flash, short shots, and part inconsistencies to occur, the injection molding machine as shown in FIG. 2 of the drawings is provided in accordance with the present invention with a dynamic pressure control system. The electrical circuitry utilized in the dynamic pressure control system is depicted in FIG. 3 of the drawings and will be described hereinafter. In addition, a schematic representation of the electrical circuitry of the dynamic pressure control system shown in FIG. 3 is provided in block diagram form in FIG. 2 of the drawings in the block bearing the legend PRESSURE CONTROL and which has the reference numeral 30 applied thereto. The dynamic pressure control system of the present invention is operable to control the pressure in mold cavity 16 by controlling the shot size of material injected from nozzle 24 into the mold 10 based on sensings of cavity pressure obtained directly from the cavity 16. Accordingly, as shown in FIG. 2 of the drawings, the block designated by reference numeral 30 is connected in circuit with sensing means 32, the latter being operable in a manner yet to be described to provide sensings of the pressure in cavity 16, and is connected in circuit with one end of the housing 24.

With reference to FIG. 1 of the drawings, sensing means 32 includes an ejector pin 34 and a force measuring means 36. The ejector pin 34 is supported for movement relative to the mold cavity 16 in an opening 37 provided for this purpose in mold 10. As such, one end of ejector pin 34 is located in juxtaposed relation to the opening 16a provided in mold cavity 16 such that as the molding material flows into the cavity 16 and fills the latter, the molding material also engages the end of the ejector pin 34 and applies a pressure thereagainst. The pressure exerted by the molding material on the end of ejector pin 34 reflects the pressure of the molding material present in the mold cavity 16. The ejector pin 34 is caused to move in relation to the amount of pressure exerted thereon by the molding material. This movement of the ejector pin 34 is sensed, in a manner yet to be described, whereby it is possible to obtain a measurement of the pressure of the molding material in the mold cavity 16.

As has been depicted in FIG. 1, the other end of ejector pin 34 engages the force measuring means 36. The latter includes a transducer, of the type which has been known heretofore in the prior art, which operates to transform force measurements into electrical signals. More specifically, the force measuring means 36 functions to measure the strain being imposed thereon by the ejector pin 34, which in turn is a reflection of the force being applied to the ejector pin 34 by the pressure of the molding material in the mold cavity 16. For this purpose, the force measuring means 36 includes a conventional type strain gauge which is capable of measuring the aforedescribed strain. An output in the form of an electrical signal is produced by the force measuring means 36 corresponding to the strain measured by the strain gauge.

Turning now to a description of the circuitry illustrated in FIG. 3 of the drawings, the pressure of the molding material in the cavity 16 causes an electrical imbalance on the bridge circuit 38 of the transducer of the force measuring means 36. The electrical imbalance created thereby results in an electrical signal being sent to the first stage amplifier 40. The latter amplifier 40 is one of the components housed in the dynamic pressure control box 30 schematically depicted in FIG. 2 of the drawings. The first stage amplifier 40 is of the differential input type which functions to amplify the electrical signal, provided from the sensing means 32, to a usable level. The electrical signal then passes out of the first stage amplifier 40 and is fed into a calibration control 42. The latter control 42 is employed for purposes of adjusting the calibration of the system to compensate for the inclusion in the force measuring means 36 of transducers which may be of varying sensitivity.

Continuing with the description of the electrical circuit depicted in FIG. 3 of the drawings, from the calibration control 42 the signal is fed to a multi-terminal switch 44 wherein each of the terminals thereof is correlated to the size of an ejector pin. The switch 44 is used to calibrate the electrical signal received thereby for pounds per square inch (psi) of pressure in the mold cavity 16. This is necessary because the force measuring means 36 sense the force being applied thereto by the ejector pin 34. However, ejector pins of varying diameters cause different loads to be applied to the force measuring means 36 for any given pounds per square inch of pressure.

From the appropriate terminal of switch 44 which corresponds to the particular size of ejector pin 34 which is being employed in the mold 10, the signal is taken and fed to the second stage buffer amplifier 46. The latter amplifier 46 is used to buffer the signal from the output. Further, the amplifier 46 is also used as a filter to eliminate stray signals coming from the sensing means 32 due to electrical noise. The signal coming out of the second stage buffer amplifier 46 passes through a gain adjusting potentiometer 48 and then to a metered gain amplifier 50. The function of the potentiometer 48 is to calibrate the signal in terms of pounds per square inch so that the readings which are read out on the meter 52 are in pounds per square inch. The signal is also fed to a mold pressure analog output jack schematically depicted in FIG. 3 by the box 54. The output jack 54 is preferably included in the dynamic pressure control system as a means of providing the latter with an auxiliary read out capability.

Finally, the signal is passed to the comparative section of the dynamic pressure control system which is comprised of the three comparators 56, 58 and 60. The comparator 56 compares the signal to the setting on control 62, which constitutes the high mold set point setting for the system. Comparator 58 is the low pressure comparator and compares the signal with the setting on control 64 which is the low mold pressure setting. Comparator 60 compares the signal with the set point setting on control 66. The latter setting represents the dynamic pressure control system set point, i.e., the pressure setting required for purposes of obtaining the proper filling and packing of the mold 10.

Whenever the pressure signal from the mold cavity 16 indicates that the pressure therein is higher than the set point set on the controls 62 and 66, the comparators 56 and 60 turn on an output which energizes relays 68 and 72, respectively, and whenever the pressure signal from mold cavity 16 indicates that the pressure therein has fallen below the set point set on the control 64, the comparator 58 turns on an output which energizes relay 70. The energization of relay 68 indicates that the high set point has been reached. Relay 70 is energized when the low set point has been reached, and relay 72 is energized when the dynamic pressure control set point has been surpassed.

Whenever one of the relays 68, 70 or 72 is energized, it is maintained closed by a set of sealing contacts 68a, 70a or 72a, respectively. The contacts 68a, 70a or 72a keep the relays 68, 70 or 72 energized, using the relay logic power which is supplied at terminal 74. When energized, the relays 68, 70 and 72 remain energized until the reset button, schematically illustrated in FIG. 3 of the drawings by the closed contacts 88, is depressed to open the circuit of the coils of the relays 68, 70 and 72.

In accord with the preferred embodiment of the invention, the dynamic pressure control system embodies a check alarm relay 78 which is energized by a check alarm which is received at terminal 76. The function of the relay 78 is to provide an indication of whether or not an alarm condition has been detected at a specific point in the machine cycle. When relay 78 is energized, the sealing contacts 78a are closed. The function of the contacts 78a is similar to that previously set forth hereinabove in connection with the description of the contacts 68a, 70a and 72a associated with the relays 68, 70 and 72, respectively. In addition, when the relay 78 is energized, the contacts 78b are also closed allowing current to travel to the appropriate alarm light 80, 82 or 84. The light 80 operates to indicate when a high alarm occurs. Light 82 is the low alarm light. Light 84 is a master alarm light and indicates that either a high or low alarm has occurred. The lights 80, 82 and 84 are actuated either by relay 68 or relay 70. More specifically, the light 80 is actuated by relay 68 through contacts 68b, the light 82 is actuated by relay 70 through contacts 70b, and the light 84 is actuated either by relay 68 through contacts 68c or by relay 70 through contacts 70c.

The dynamic pressure control system may, when found desirable, be provided with a 110-volt output means 86 capable of being utilized as an auxiliary system driver to provide a source of power for driving an auxiliary system. In the interest of clarity of illustration, the circuit for output means 86 has been shown separately, however it is to be understood that this circuit when employed is connected in circuit relation with the circuitry for the lights 80, 82 and 84 such that the output means 86 will become actuated either by the relay 68 through contacts 68d or relay 70 through contacts 70d whenever a high or low alarm light is indicated.

As best understood with reference to FIGS. 2 and 3 of the drawings, the control signals provided from the dynamic pressure control system are in the form of contact closures from relays 68 or 72. More specifically, in response to pressure sensings obtained from the mold cavity 16, relays 68 and 72 operate to cause actuation of the contacts 68e and 72b, respectively. The contacts 68e and 72b are preferably incorporated into the existing panel logic of the molding machine so as to be operable for purposes of energizing or deenergizing the corresponding solenoid 90 or 92, and as such have been illustrated separately in FIG. 3 of the drawings.

As shown in FIG. 2, the solenoid 90 which comprises a part of the solenoid operated valve 104 is the injection forward solenoid which allows hydraulic oil to flow to the injection cylinder 28. The solenoid 92 which comprises a part of the solenoid operated valve 102 is the booster solenoid which allows the high pressure or high volume pump 98 to supply hydraulic oil to the injection cylinder 28.

Whenever the mold pressure in the cavity 16 sensed by the sensing means 32 becomes higher than the dynamic pressure control setting on control 66, the relay 72 becomes energized. This opens the circuit to the booster solenoid 92, deenergizing the booster solenoid 92 and switching the booster pump 98 out of the circuit thereby allowing the holding pump 94 to supply hydraulic oil to the injector cylinder 28. Whenever the cavity pressure sensed by sensing means 32 becomes higher than the high set point set on control 62, the injection forward solenoid 90 becomes energized which stops the flow of all hydraulic oil to the injection cylinder 28.

Referring further to FIG. 2 of the drawings, the pumps 94 and 98 are operatively connected to the motor 106 in conventional fashion such as to be capable of being driven thereby. Further, preferably regulating valves 96 and 100 are provided in the fluid circuit between the pumps 94 and 98, respectively, and the injection cylinder 28. The regulating valve 96 is employed as a means of providing a control setting for the holding pressure while regulating valve 100 is employed as a means of providing a control setting for the booster pressure. Finally, suitable drain tanks 108, 110, and 112 are preferably associated with the pump 98, pump 94, and solenoid operated valve 102, respectively.

Proceeding now with a description of the mode of operation of that portion of the dynamic pressure control system which has been referred to so far hereinabove, the latter operates by measuring the pressure of the molding material during mold filling. More particularly, the dynamic pressure control system operates by sensing the cavity pressure and controlling the booster pressure accordingly. In accord with the preferred embodiment of the invention, a sensing means 32 is inserted into the cavity 16 of the mold 10 and is operable to provide an electrical signal output corresponding to the pressure sensed thereby as existing in the mold cavity 16. This signal is amplified by amplifier 40 to a usable level, calibrated to provide readings in pounds per square inch, and compared by comparators 56, 58 and 60 to a plurality of predetermined pressure set points. One of the latter set points comprises a low pressure mold setting provided by control 64, another comprises a high pressure mold setting provided by control 62, and the third comprises a dynamic pressure control set point provided by the control 66. The latter set point corresponds to the cavity pressure required to fill and pack the mold 10 regardless of viscosity changes, timer inconsistencies, or power fluctuations. The molding machine 18 is provided with an injection forward solenoid 90 which when energized allows hydraulic oil to flow to the injection cylinder 28, and a booster solenoid 92 which when energized allows the high pressure pump 98 to supply hydraulic oil to the injection cylinder 28. The dynamic pressure control system is provided with control means including the relay 72 which operates to deenergize the booster solenoid 92 whenever the mold pressure in the cavity 16 is sensed to have become higher than the dynamic pressure control set point on control 66 thereby switching the high pressure pump 98 out of the circuit and allowing the holding pump 94 to supply hydraulic oil to the injection cylinder 28, and the relay 68 which operates to deenergize the injection forward solenoid 90 whenever the mold cavity pressure is sensed to have become higher than the high pressure set point on control 62 thereby stopping the flow of all hydraulic oil to the injection cylinder 28.

Referring now to FIGS. 4–9 of the drawings, each of these Figures comprises a graph illustrating the change in pressure which occurs during a cycle of operation of a molding machine as sensed at a different point in the molding machine but based on the same units of time. It is readily apparent from even a cursory review of the graphs depicted in the FIGS. 4–9 of the drawings that the farther away the point is from the mold cavity at which the sensings are made, the more the disparity between the pressure change which is actually occurring in the mold cavity 16 and that occurring at the point at which the sensings are being taken. These graphs therefore clearly illustrate the importance of utilizing sensings taken directly in the mold cavity 16 as the basis for providing the necessary corrections required to eliminate the pressure variations in the molding material which otherwise are the cause of flash, short shots and part inconsistencies occurring.

In addition to operating in the manner which has been previously described hereinabove, the dynamic pressure control system 30 in accordance with the present invention may also have embodied therein circuitry which enables the system 30 to perform two additional types of control operations. For example, referring to FIG. 3 of the drawings, the dynamic pressure control system 30 may be provided with suitable circuit means operable for purposes of adjusting the setting on control 66 when the pressure sensed in the mold cavity 16 either exceeds the high pressure set point on control 62 or falls below the low pressure set point on control 64. When required, such an adjustment is intended to be made in such a manner that it becomes effective to establish a new setting for the control 66, i.e., a new dynamic pressure control set point for use during the next cycle of operation of the machine. More specifically, the dynamic pressure control system 30 for this purpose embodies a circuit means 114 which is operatively connected as depicted by the dotted line 116 in FIG. 3 of the drawings to the control 66. In the interest of clarity of illustration, it has not been shown in FIG. 3 of the drawings, however it is nevertheless to be understood that the circuit means 114 is also connected through terminal 118 to the lead which interconnects relays 68 and 70. Accordingly, when the high pressure set point on control 62 is exceeded thereby causing relay 68 to be energized, the effect of the latter energization in addition to opening and closing the other contacts, as described previously hereinabove, cooperatively associated therewith is to also cause contact 68f to close. This in turn causes the circuit means 114 to operate to provide a signal to the control 66 which is effective to adjust the set point on control 66 to a lower setting. Similarly, when the pressure sensed in the mold cavity 16 falls below the low pressure set point on control 64 thereby causing relay 70 to be energized, the effect of the latter energization in addition to opening and closing the other contacts, as described previously hereinabove, cooperatively associated therewith is to also cause contact 70e to close. This in turn causes the circuit means 114 to operate to provide a signal to the control 66 which is effective to adjust the set point on control 66 to a higher setting. Thus it can be seen that the dynamic pressure control system 10 is also operable to cause the dynamic pressure control set point on control 66 to be controlled in a modulating fashion.

Another manner in which the dynamic pressure control system 30 is capable of functioning to perform a control operation involves the use of both pressure and time set points to establish the parameters which dictate the conditions under which the injection machine process operates. As was noted herein at the outset, molding machines are designed to deliver a constant amount of energy to plastic in the heating cylinder. For example, temperature controllers are used to carefully adjust the conductive heat given to the plastic in the heating cylinder. Likewise, screw, back pressure, and rotation are carefully controlled to adjust the amount of work given to the plastic. In the hydraulic circuit the injection pressure is controlled using electro-hydraulic or mechanical relief valves, so that the exact plastic pressure desired can be achieved. The net result is a plastic in the heating cylinder which has relatively uniform energy levels. However, during the injection process large energy losses occur as the plastic transfers from the heating cylinder into the injection mold cavities. These losses are primarily due to variations in plastic viscosity caused by the non-Newtonian and non-steady state of the process. Variations in energy losses can also be caused by changes in regional composition, lot-to-lot resin variations, machine malfunctions, and operator errors. Therefore, the plastic energy in the cavity can vary considerably. This results in variations in plastic cavity pressures and in fill times varying, and causes changes in plastic conditions which result in variations in the finished part, properties, such as shrinkage, strength, and orientation. Looking at the general energy equation one sees that energy equals pressure times change in volume (Pdv), plus volume times change in pressure (Vdp). The Pdv part of this equation can usually be ignored for plastics, since it accounts for only about 10 percent of the total energy generated in plastic during flow. However, the Vdp part of this equation is very significant in determining the total energy content of the plastic in the injection mold. A typical cavity pressure versus time curve is made up of three significant areas, i.e., fill phase, packing and cooling. For purposes of control the most important areas are the fill and packing phases, since it is only during these times that changes in machine control settings can affect the plastic conditions in the mold. After a peak cavity pressure is reached, the injection mold gates freeze, and there is no longer any communication between the injection cylinder and the mold. Therefore, control changes at this time can have no effect in the cavity.

Figure 10:
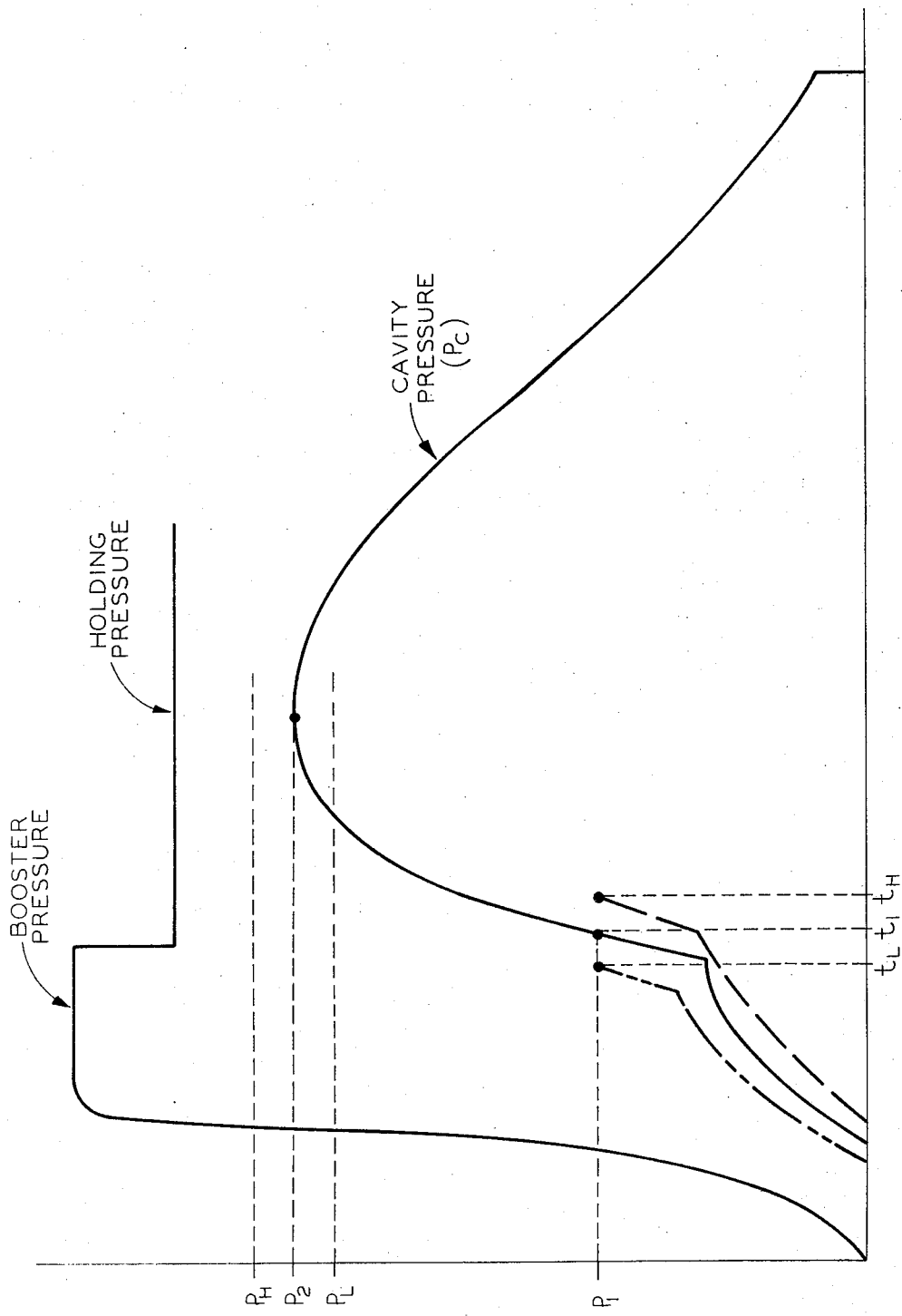
FIG. 10 is a graph illustrating a typical plastic pressure curve of the pressure in a mold cavity wherein the ordinate of the graph is in terms of units of pressure and the abscissa is in terms of units of time.

In accordance with the present invention, a dynamic pressure control system 30 has also been provided whereby pressure and time set points on a plastiv pressure curve can be used to control the injection molding process. FIG. 10 shows a typical plastic pressure curve of the pressure in a mold cavity 16 with two pressure time points $P_1$ and $P_2$ indicated. As shown in FIG. 10, $P_2$ is a point which defines the peak cavity pressure which it is desired should be reached in the mold cavity 16. When pressure set point $P_2$ is reached, it is possible for an appropriate control circuit to be triggered automatically. Although in FIG. 10, $P_2$ indicates the peak cavity pressure, it is to be understood that other points along the curve could comprise the set point $P_2$ depending on the type of control circuit which it was desired to trigger when $P_2$ is reached. If the actual cavity pressure reached in mold cavity 16 exceeds $P_2$, i.e., reaches the level of $P_H$, then the pressure set point $P_1$ must be reduced. On the other hand, if the actual cavity pressure reached in mold cavity 16 is less than $P_2$, i.e., reaches only the level of $P_L$, then the pressure set point $P_1$ must be increased.

Referring again to FIG. 10 of the drawings, pressure set point $P_1$ is a point at which pressure changes can be made on the injection pump settings that will effectively adjust cavity pressure. A change in booster pump pressure setting occurs only if at time $t_1$ the plastic pressure is higher or lower than setting $P_1$. For purposes of illustration in FIG. 10, $P_1$ occurs at time $t_1$. As long as this condition exists, no change will be made in injection pressure since it has previously been preestablished that if $P_1$ occurs at $t_1$ then the pressure in mold cavity 16 will reach the desired level of $P_2$. However, if pressure $P_1$ is reached at a faster rate, i.e., at time $t_L$ such that at time $t_1$ the plastic pressure is higher than $P_1$, then the dynamic pressure control system 30 is operable to cause the injection pump to reduce its pressure. Conversely, if at $t_1$ the plastic pressure is lower than $P_1$, i.e., the pressure $P_1$ is reached at a slower rate, i.e., $t_H$, then the control system 10 will cause the booster pump pressure to be increased. This adjustment controls the energy input to the plastic in the injection mold 10. Due to inertial effects of plastic and oil, the plastic pressure in the mold cavity 10 will continue to rise after the booster pump has been shut off. However, this inertia will be a finite value, and the pressure set points $P_1$ and $P_2$ can therefore be adjusted downward or upward to compensate for the effects of this inertial energy on cavity pressure.

With reference now to FIG. 2 of the drawings, there is shown therein the circuitry whereby the aforementioned adjustments are made. Thus, as shown therein there is provided a timer 120 which is connected in circuit with a power amplifier 122 and a flow control valve 124. The operation of the timer 120 is initiated by means of a pushbutton switch 126 which is operatively connected to the start switch (not shown) of the injection molding machine whereby when the latter switch is operated to initiate a cycle of operation of the machine, the timer is also caused to start running. The timer 120 is provided with a means 128 whereby it may be set with a predetermined high time limit and a means 130 which enables a low time limit to be set in the timer 120. Although not depicted in FIG. 2 of the drawings in the interest of clarity of illustration, it is to be understood that the timer 120 is connected in circuit such that power is supplied thereto through terminals 132 and 134. As illustrated in FIG. 2, the aforedescribed circuitry functions in the following manner. The pressure of the plastic in the mold cavity 16 is sensed by sensing means 32. This pressure is sent to the control system 30 which conditions and amplifies the signal received thereby in the manner which has previously been described hereinabove. When the plastic in the mold cavity 16 is sensed to have reached $P_1$, which corresponds to the set point on control 66, this causes relay 72 to be energized. The energization of the latter relay 72 causes the contacts 72a to close which in turn stops the timer 120. The time which is on the timer 120 when it stops is compared with a set point value $t_1$. If there is an error between the actual time at which $P_1$ occurs and $t_1$, then an adjustment is made to the flow control valve 124 which in turn in effect causes either an increase or a decrease to occur in the pressure of the fluid being supplied by the booster pump. More specifically, if such an error is found to exist, an output is provided from timer 120 to power amplifier 124 where the output is amplified and then transmitted to the flow control valve 124 which functions to adjust the flow rate accordingly. In accord with one embodiment of the present invention, the flow control valve 124 comprises an electro-hydraulic valve of the type commonly used on molding machines. However, the aforedescribed adjustment could also be accomplished through the use of other means such as through the use of a servo-motor, adjusting the hydro-mechanical valves, or if desired by hand. The control point $P_1$ is selected so as to allow the cavity pressure to reach a pre-set value of pressure $P_2$. The point $P_2$ is selected such that the cavity 16 is always full, i.e., never a short shot, and not overpacked, i.e., never flashed. The level of pressure point $P_1$ is always selected so as to be below the level of pressure point $P_2$ so that an interval of time will exist in which the change in hydraulic pressure caused by pressure point $P_1$ can effect cavity pressure changes in the same cycle. Thus, it can be seen that a dynamic pressure control system has been provided which is capable of controlling the total amount of energy developed in an injection mold cavity, even though variations in the process may exist, and of controlling the rate at which this energy is generated in the cavity, thereby controlling flow rate and molecular orientation.

Although only one embodiment of a dynamic pressure control system constructed in accordance with the present invention has been shown in the drawings and described hereinabove, it is to be understood that modifications in the construction thereof may be made thereto by those skilled in the art without departing from the essence of the invention. In this regard, although a dynamic pressure control system has been described and illustrated which is capable of performing three control functions, i.e., sense and adjust cavity pressure during the same cycle of operation, modulate the dynamic pressure control set point for purposes of succeeding cycles of operation, and change the point in the cycle of operation when the dynamic pressure control set point is reached, it is understood that, if so desired, the dynamic pressure control system need not be provided with the circuit means 114 or the circuitry including timer 120. Also, although one specific form of sensing means has been described hereinabove and has been illutrated in FIG. 1 for use in the dynamic pressure control system, any sensing device which can measure time or pressure from material contained in a mold is capable of being utilized therein. Such sensing devices include strain gauges, piezoelectric, and transistor-type force or pressure sensing devices. The force or pressure may be sensed directly from the material in the mold cavity or it can be sensed remotely, using ejector pins, dummy pins or similar force transmitting devices. Moreover, the sensing device may be a slide transducer or button transducer. Diaphragm transducers which sense material pressure directly at the cavity surface or within the cavity are also intended to be included. In addition, although in the preferred embodiment of the invention solenoid operated valves have been illustrated as being employed, it is to be understood that other forms of valves capable of responding to an electrical signal may be substituted therefor without departing from the essence of the invention.

Thus, it can be seen that the present invention provides a novel and improved dynamic pressure control system which is operable to control cavity pressure in molding machines and casting machines by controlling the shot size of material fed to the machine cavity based on sensings of cavity pressure obtained directly from the cavity. The dynamic pressure control system of the present invention is operable to control cavity pressure by sensing deviations in the required level of cavity pressure during a given cycle of operation and by providing corresponding corrections thereby to restore the cavity pressure to the necessary level during the same cycle that the deviations are sensed. In addition the dynamic pressure control system of the present invention is capable of being provided with circuit means operable for purposes of causing modulation of the setting of the dynamic pressure control set point during succeeding cycles of operation of the machine if required, and/or is capable of being provided with timer means operable to change the point, as measured in units of time, in the cycle of operation of the machine when the dynamic pressure control set point is reached. A dynamic pressure control system in accord with the present invention has been provided which is operable to consistently provide the exact cavity pressure needed during each sucessive cycle of operation of the machine. Moreover, the dynamic pressure control system of the present invention provides a system for controlling cavity pressure wherein electronic sensing is employed thereby providing fast responsive time anabling pressure rises to be limited rapidly. Finally there has been provided a dynamic pressure control system for controlling cavity pressure which is readily capable of being used with conventional type molding machines and casting machines, which is characterized by its relatively long operating life, and which is relatively easy to assemble and employ.

Having thus described the invention, we claim:

1. A dynamic pressure control system particularly adapted for use in molding machines and casting machines of the type capable of operating in cycles, for controlling cavity pressure in the mold cavity of the mold of the machine during each cycle of machine operation comprising:

a. sensing means supported in the mold of the machine in communication with the mold cavity and in the path of flow of material fed to the mold cavity, said sensing means sensing the movement of material in the mold cavity and transforming the movement of the material into a force signal;

b. calibrating means operatively connected to said sensing means to receive said force signal therefrom, said calibrating means generating from said force signal a signal corresponding to pressure;

c. comparison means connected in circuit relation with said calibrating means to receive therefrom said signal corresponding to pressure, said comparison means operating to compare said signal corresponding to pressure to a pair of predetermined pressure set points and to provide a first output in response to said signal corresponding to pressure reaching the level of one of said pair of predetermined pressure set points and a second output in response to said signal corresponding to pressure reaching the level of the other of said pair of predetermined pressure set points;

d. pump means operable to cause material to be fed to the mold cavity, said pump means having a first operating condition wherein material is caused to be fed to the mold cavity at a first rate and a second operating condition wherein material is caused to be fed to the mold cavity at a second rate; and e. control means connected in circuit relation with said pump means and said comparison means, said control means in response to the receipt thereby of said first output from said comparison means when said pump means is in said first operating condition operating to alter the operation of said pump means to effect during the same cycle of machine operation a change in said first rate at which material is fed to the mold cavity and in response to the receipt thereby of said second output from said comparison means when said pump means is in said second operating condition operating to alter the operation of said pump means to effect during the same cycle of machine operation a change in said second rate at which material is fed to the mold cavity.

2. The dynamic pressure control system as set forth in claim 1 wherein said sensing means includes an ejector pin and a strain gauge transducer operatively connected thereto, said ejector pin is mounted in the mold for contact by the material in the mold cavity and is movable relative to the mold in response to movement of material in the mold cavity, and said strain gauge transducer is supported in the mold in contact with one end of said ejector pin and is operable to transform movement of the material in the mold cavity transmitted through said ejector pin to said strain gauge transducer into a force signal.

3. The dynamic pressure control system as set forth in claim 2 wherein said calibrating means includes a calibration control means operable to calibrate the system in accord with the sensitivity of said strain gauge transducer and switch means correlated to the size of said ejector pin to transform the force signal produced by said strain gauge transducer into a signal corresponding to pressure.

4. The dynamic pressure control system as set forth in claim 1 wherein said comparison means includes a first set point control operable for setting a predetermined high pressure set point thereon, a first comparator operatively connected to said first set point control to compare said signal corresponding to pressure to the high pressure set point on said first set point control and to provide said first output when said signal corresponding to pressure reaches the level of the high pressure set point on said first set point control, a second set point control operable for setting a predetermined dynamic pressure set point thereon, and a second comparator operatively connected to said second set point control to compare said signal corresponding to pressure to the dynamic pressure set point on said second set point control and to provide said second output when said signal corresponding to pressure reaches the level of the dynamic pressure set point on said second set point control.

5. The dynamic pressure control system as set forth in claim 4 wherein said pump means includes a booster pump, a first valve means having an open position and a closed position operatively connected to said booster pump for controlling the flow from said booster pump, a holding pump, and a second valve means having an open position and a closed position operatively connected to said holding pump for controlling the flow from said holding pump, the material being fed to the mold cavity at said first rate by said booster pump and said holding pump when said first and second valve means are both in said open position thereof, and at said second rate by said holding pump when said first valve means is in said closed position thereof and said second valve means is in said open position thereof.

6. The dynamic pressure control system as set forth in claim 5 wherein said control means includes first relay means connected in circuit relation with said first valve means and said first comparator operable for causing during the same cycle of machine operation said first valve means to move from said open position to said closed position thereof in response to said first output being provided to said first relay means from said first comparator.

7. The dynamic pressure control system as set forth in claim 6 wherein said control means further includes second relay means connected in circuit relation with said second valve means and said second comparator operable for causing during the same cycle of machine operation said second valve means to move from said open position to said closed position thereof in response to said second output being provided to said second relay means from said second comparator.

8. The dynamic pressure control system as set forth in claim 1 further comprising circuit means connected in circuit relation with said comparison means operable to effect a change in the setting of one of said pair of predetermined pressure set points during the succeeding cycle of machine operation in response to said signal corresponding to pressure exceeding or falling below the limits of a preestablished pressure range.

9. The dynamic pressure control system as set forth in claim 1 further comprising timer means connected in circuit relation with said comparison means and said control means operable to compare the time at which said signal corresponding to pressure reaches the level of said one of said pair of predetermined pressure set points to a preestablished time and to effect during the same cycle of machine operation a change in said first rate of flow of material to the mold cavity in response to said signal corresponding to pressure reaching the level of said one of said pair of predetermined pressure set points at some time other than said preestablished time.

10. A dynamic pressure control system, particularly adapted for use in molding machines and casting machines of the type capable of operating in cycles, for controllint cavity pressure in the mold cavity of the mold of the machine during each cycle of machine operation comprising:

a. sensing means supported in the mold of the machine in communication with the mold cavity and in the path of flow of material fed to the mold cavity, said sensing means sensing the movement of material in the mold cavity and transforming the movement of the material into a force signal;

b. calibrating means operatively connected to said sensing means to receive said force signal therefrom, said calibrating means generating from said force signal a signal corresponding to pressure;

c. comparison means connected in circuit relation with said calibrating means to receive therefrom said signal corresponding to pressure, said comparison means operating to compare said signal corresponding to pressure to a pair of predetermined pressure set points and to provide a first output in response to said signal corresponding to pressure reaching the level of one of said pair of predetermined pressure set points and a second output in response to said signal corresponding to pressure reaching the level of the other of said pair of predetermined pressure set points;

d. pump means operable to cause material to be fed to the mold cavity, said pump means including a booster pump, a first valve means having an open position and a closed position operatively connected to said booster pump for controlling the flow from said booster pump, a holding pump, and a second valve means having an open position and a closed position operatively connected to said holding pump for controlling the flow from said holding pump, the material being fed to the mold cavity at a first rate by said booster pump and said holding pump when said first and second valve means are both in said first position thereof and at a second rate by said holding pump when said first valve means is in said closed position thereof and said second valve means is in said open position thereof; and e. control means connected in circuit relation with said pump means and said comparison means, said control means in response to the receipt thereby of said first output from said comparison means when said first valve means is in said open position thereof operating to cause said first valve means to move to said closed position thereof to effect during the same cycle of machine operation a change in said first rate at which material is fed to the mold cavity and in response to the receipt thereby of said second output from said comparison means when said second valve means is in said open position thereof operating to cause said second valve means to move to said closed position thereof to effect during the same cycle of machine operation a change in said second rate at which material is fed to the mold cavity.

11. The dynamic pressure control system as set forth in claim 10 wherein said first valve means comprises a first operated valve and a first solenoid.

12. The dynamic pressure control system as set forth in claim 11 wherein said second valve means comprises a second operated valve and a second solenoid.

13. The dynamic pressure control system as set forth in claim 10 wherein said comparison means includes a first set point control operable for setting a predetermined high pressure set point thereon, a first comparator operatively connected to said first set point control to compare said signal corresponding to pressure to the high pressure set point on said first set point control and to provide said first output when said signal corresponding to pressure reaches the level of the high pressure set point on said first set point control, a second set point control operable for setting a predetermined dynamic pressure set point thereon, and a second comparator operatively connected to said second set point control to compare said signal corresponding to pressure to the dynamic pressure set point on said second set point control and to provide said second output when said signal corresponding to pressure reaches the level of the dynamic pressure set point on said second set point control.

* * * * *